Figure 1:
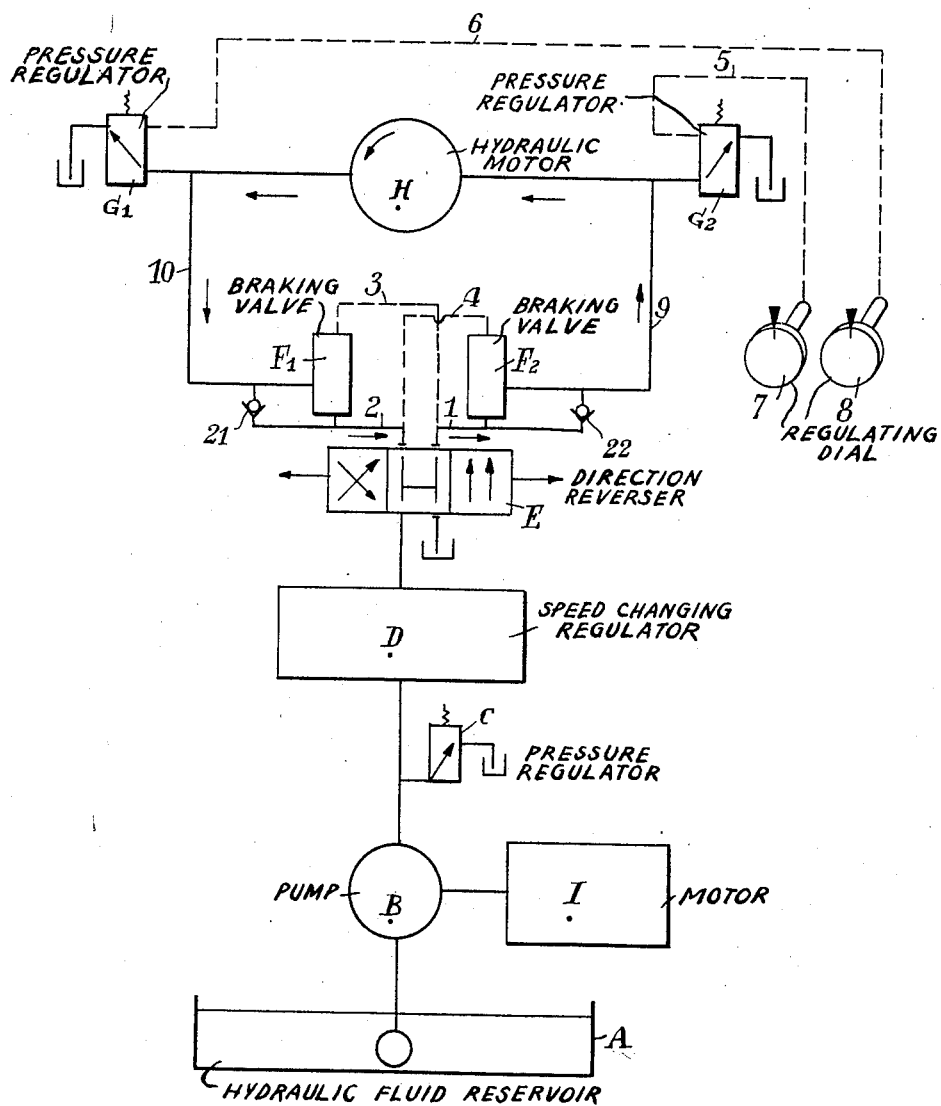

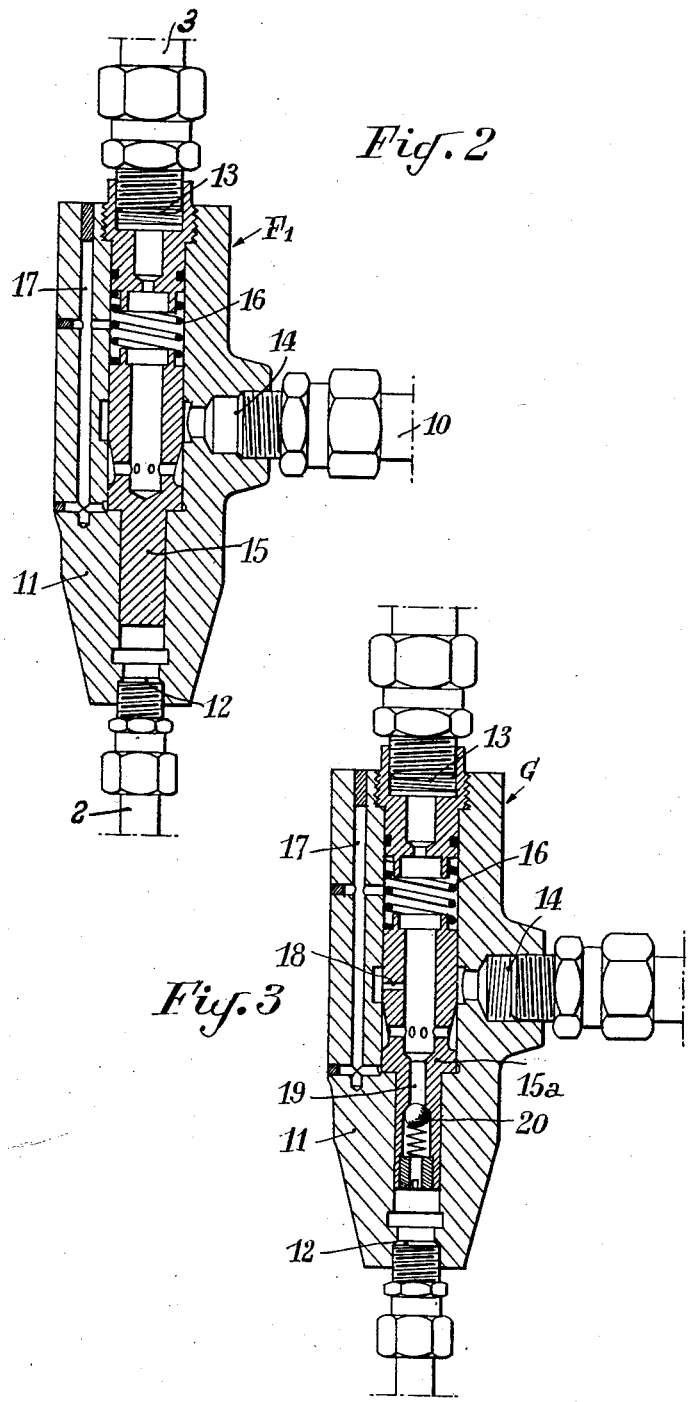

United States Patent Office 3,125,324
Patented Mar. 17, 1964

3,125,324
VEHICLE HYDRAULIC EQUIPMENT
Claude Vivier, Charleville, Ardennes, France, assignor to Richier S.A., Paris, France
Filed Sept. 11, 1961, Ser. No. 137,406
Claims priority, application France Sept. 14, 1960
2 Claims. (Cl. 253—1)

Certain vehicles are powered by hydraulic transmission systems comprising one or more variable or constant output pumps. These pumps in turn actuate one or more hydraulic motors through the medium of a set of valves, regulators, etc. which may or may not be externally controlled. The general problem of translation of a vehicle is thus resolved for any direction of travel, that is, the correct changes in speed are effected as a function of road grades encountered. These arrangements may also be improved to varying degrees and thus include, among other devices, a system of speed changing by selector switch.

These arrangements are satisfactory for numerous vehicles. Nevertheless, when it is found necessary to control:

(1) the deceleration of these vehicles during periods of braking,
(2) their acceleration upon starting from rest,
(3) the sudden deceleration or acceleration due to the inertial forces experienced during uphill or downhill travel, it is necessary to utilize a certain number of complementary devices. The present invention is concerned with such devices, characterized by their simplicity and usefulness.

Furthermore, it can be useful for the driver of the vehicle to regulate the action of the hydraulic devices upon the acceleration or deceleration values as a function of the work or displacement to be obtained.

Of particular interest is the application of these devices to road rollers used to compress road surfaces. In this specific—but not limiting—case, it is essential that the road roller direction be reversed without damage to the road surface, whatever the condition of the material used (nature, temperature, coarseness, humidity, etc.), and whatever the speed of the roller or the slope of the surface.

Due to the many usages for the device, as foreseen from the above specifications, the possibility of a completely automatic installation suitable for all purposes is precluded. It is necessary therefore that the driver be given a way to adapt the machine to immediate work requirements, and that he have at his disposal a system for reading and controlling oil pressure and flow in the reservoir return lines, downstream from the hydraulic receivers.

In the present invention these pressure regulating devices are advantageously furnished with a dial showing the different working ranges of the machine. For purposes of symmetry, the installation contains two devices which act at all times downstream from the hydraulic receiver and as a function of direction of travel. The controls for these devices may be located together or separately according to particular service requirements.

The range dials have different sections, for example: road travel, work on level surface, work on graded surface, etc. Each section may also be graduated according to percentage of slope. Each one of these sections corresponds respectively to the different working ranges, which in turn correspond respectively to the pre-determined pressure settings of the regulators mounted downstream from the hydraulic receiver or receivers.

In the present invention the control apparatus consists of a group of devices located downstream from the hydraulic receiver or receivers on the evacuation line going from the receiver or receivers to the oil reservoir. It includes a pressure regulator with a calibrated control, the dial of which bears all indications needed by the driver in the choice of a pressure setting suitable to the work to be accomplished. It also includes a braking valve controlled by the oil pressure in the supply line, located upstream from the receiver or receivers.

The features and advantages of the invention will become more clearly apparent from the following description and claims, with reference to the accompanying drawing in which:

FIGURE 1 is a diagram of the hydraulic mounting.
FIGURE 2 is an axial section of the braking valve.
FIGURE 3 is an axial section of a variation of the braking valve.

As shown in FIG. 1, the hydraulic installation to which the invention is to be applied comprises, as already known, a hydraulic fluid reservoir A from which a line runs across pump B actuated by a motor I, thence to a pressure regulator C, a speed changing device D, and a reversing device E, operated manually or otherwise. The two lines 1 and 2 leaving the reversing device E are connected to the two sides of a hydraulic receiver H having a two-directional operation, and controlling the movement of the wheels or the drive chains of the vehicle.

Each of the supply or evacuation lines 1 or 2 of the receiver or receivers H, upon leaving the reversing device E, crosses a braking valve $F_2$ or $F_1$ cross-connected to line 2 or 1 (evacuation or supply) through a pilot line 4 or 3. Each braking valve $F_2$ or $F_1$ is connected to the receiver H by a line 9 or 10 by means of a pressure regulator $G_2$ or $G_1$ whose pilot circuit 5 or 6 is controlled by a regulating dial 7 or 8. The operation of this pressure regulator $G_1$ or $G_2$ may be obtained by progressive throttling of the pilot line or by any other means known. In addition, each line 9 or 10 is connected both to the receiver H and to the pressure regulators $G_1$ and $G_2$, and includes a branch-off to braking valve $F_2$ or $F_1$ upon which is mounted a non-return valve 22 or 21 preventing backflow of the hydraulic fluid in line 9 or 10 into supply line 1 or 2.

As shown in FIG. 2, each brake valve $F_1$, for example, consists of a body 11 with three orifices 12, 13 and 14; orifice 12 is joined to the pump B discharge line by line 2; orifice 13 is joined to the hydraulic fluid reservoir by line 3; orifice 14 is joined to the hydraulic receiver outlet by line 10.

Within the body 11 is a sliding piston 15, operated by a spring 16. Only by sufficient pressure at orifice 12 can the action of spring 16 be compensated for, thus displacing the piston 15. The greater the pressure at orifice 12, the further piston 15 is pushed and the greater the flow of fluid entering orifice 14 and going toward the reservoir through orifice 13. On the other hand, as the pressure at 12 decreases (down to the limit of compressibility of spring 16), the fluid is progressively braked in its flow from orifice 14 to orifice 13. The body 11 of the brake valve is fitted with drain canals 17 providing for the recovery of fluid from internal leaks.

The operation of this assembly, which will be described hereinafter, for the direction of travel represented in the diagram, is obviously identical when the direction of travel is reversed, the role of the lines joined to the receiver being reversed.

The pressure and flow of the motive oil in the supply line of the hydraulic receiver or receivers are pre-determined by the choice of speed desired by the driver and by the manoeuver following the change of speed D. Moreover, the driver, taking into account the nature of the work to be accomplished, and guided by the markings on the work range dial located on the remote control device 7 or 8 for the setting of pressure regulator $G_2$ or $G_1$ situated upstream from the receiver, adjusts this setting to the maximum value desired.

During normal operation of the vehicle, as shown in FIG. 1, the pilot line 4 communicates with the pump return line 2 and is not under pressure, which allows the braking valve $F_2$ to close, the supply of fluid to line 9 and the motor H thus being by-passed through non-return valve 22. The flow of hydraulic fluid from motor H to return line 2 takes place through the braking valve $F_1$ which is opened by the fluid pressure in pilot line 3 since line 3 communicates at this time with line 1 which is pressurized.

The operation of the installation during braking, during reversal of direction, and during downhill travel is hereinafter described.

When he wishes to brake, the driver of the vehicle puts the open-centre distributor E into neutral. Lines 1 and 2 are then open to the reservoir and oil supply to the receiver H is cut off. The vehicle continues to drive the hydraulic motor H by inertia. The hydraulic motor H then acts as a generator and increases the pressure in line 10 to a point markedly above the setting of pressure regulator $G_1$. At the same time, the pressure in pilot line 3 falls and braking valve $F_1$ closes, thus shutting off return of the oil to the reservoir through line 3.

However, the oil continues to return to the reservoir through the regulator $G_1$ until the pressure in line 10 falls to the predetermined valve set by the remote control device 8. Regulator $G_1$ then closes, shutting off all oil circulation and bringing the motor H to a stop.

Since it is the kinetic energy of the vehicle which serves to move the receiver H, under the assumed operating condition the latter comes to a stop when this energy is completely absorbed. It is therefore quite evident that the setting of the safety valve $G_1$ governs the rate of deceleration of the roller.

When the driver moves the reversing device E to reverse position, oil supply to the receiver H, which was previously through line 1, is established through line 2. However, as above, owing to the inertia of the roller, the hydraulic receiver continues to turn in the direction of the arrow in the diagram, provoking a pressure drop in lines 9, and 3, and a pressure rise in line 10. At the same time, oil under pressure is delivered through line 2. As above, the braking valve $F_1$ closes, and the oil under pressure which has accumulated in line 10, is then evacuated through the pressure regulator $G_1$. The oil in line 2 is evacuated through the regulator C.

The motor H then comes progressively to a stop, as described above, but starts up again in the opposite direction under the action of the pressure exercised through line 2 across valve 21 (crossed without braking), and through line 10. The speed of the vehicle then increases to the normal operating point corresponding to the speed chosen by the driver in the direction of travel opposite to that shown in FIG. 1.

Downhill travel in a forward direction causes a sudden acceleration of the roller in a forward direction through inertial forces. The hydraulic receiver H then acts as a generator and creates a pressure drop in the supply lines 9 and 1. This pressure drop is transmitted to the braking valve $F_1$ by pilot line 3, thus causing retardation of the flow of oil from the receiver H to the reservoir through line 2. The pressure then rises in line 10 to the value pre-set on the regulator $G_1$. This setting being made according to the slope of the grade travelled, an equilibrium is then established between the pressure in lines 1 and 9 and the pressure in line 10, through the action of the braking valve $F_1$ controlled by pilot line 3. This equilibrium is maintained throughout the descent effected by the roller, and prevents the latter from attaining an acceleration greater than that permitted by the setting of the pressure regulator $G_1$.

In certain applications of the braking valve involving hydraulic circuits other than the one described above, for instance when the braking valve is mounted on the return line to the reservoir of an assembly of hydraulic jacks for a self-propelled leveller (example not to be considered as limiting), this valve can be modified so as not to function as a non-return valve.

FIG. 3 is an example of a braking valve G thus modified. In this example, the layout corresponding to reference points 11 to 14 and 16 and 17 are identical to those of braking valve $F_1$ in FIG. 2. But the piston 15 is replaced here by a piston 15a into which is cut a transverse safety channel 18, which establishes a narrow permanent passage between orifices 13 and 14. The piston 15a can also include an axial communication channel 19 between orifices 12 and 13, in which is mounted an overfeed valve 20.

The essential role of a braking valve layout similar to the one given as an example in FIG. 3 is to avoid, in certain zones of the hydraulic circuits including one or more receivers, the formation of pressure drops tending to appear whenever these receivers happen to become "motors" under the action of diverse influences.

These pressure drops, when occurring in hydraulic circuits, frequently have the disadvantage of provoking a more or less localized liberation of air or gases dissolved in the hydraulic fluid. This liberation of air or gases cannot always be instantaneously eliminated, and can cause the formation of pockets or cushions of gaseous matter which impede the regularity of the functioning of the receivers.

What I claim is:

1. A hydraulic installation connected to two supply orifices of a hydraulic motor actuating a vehicle, accomplishing automatically the control of the acceleration and deceleration of the vehicle during braking, reversal of direction and downhill travel, including a compressed liquid discharge line and a liquid return line, a manually-operated direction reverser connected to these two lines, two supply lines to the hydraulic motor connecting the direction reverser to the two supply orifices of the motor and, in each of said two connecting lines from the direction reverser to the two supply orifices of the motor, a braking valve, means by-passing said braking valve, a non-return valve mounted in said by-pass means and opposing backflow of the liquid toward the direction reverser, a pressure regulator mounted in said line between said braking valve and the hydraulic motor in order to prevent pressure of the liquid ahead of the supply orifice of the motor connected to said supply line from rising above a limiting value, a pilot line for said braking valve connecting said braking valve to the other motor supply line upstream from the braking valve mounted in the other motor supply line, said pilot line controlling the closing of the braking valve of the first supply line whenever the other supply line is not under pressure, and a means controlled by the driver of the vehicle, for setting the desired value of limiting pressure permitted by said pressure regulator.

2. An installation as set forth in claim 1, in which the driver-controlled means for setting the desired value of limiting pressure permitted by the pressure regulator of each of the two lines connecting the direction reverser to the two supply orifices of the motor includes a dial bearing indications for operation and displaceable before a reference index.

References Cited in the file of this patent
UNITED STATES PATENTS 2,071,781    Douglas _____ Feb. 23, 1937
2,599,450    Henning _____ June 3, 1952